United States Patent Office 2,752,335
Patented June 26, 1956

2,752,335

ALUMINUM-PENICILLIN-SULFA SALTS AND PROCESS

Jack Kyle Dale and Marshall Edward Bennett, Kalamazoo, Mich., assignors to The Upjohn Company, Kalamazoo, Mich., a corporation of Michigan No Drawing. Application May 8, 1953,
Serial No. 353,896

12 Claims. (Cl. 260—239.1)

This invention relates to a novel process and the novel products produced thereby. More particularly, this invention relates to a process for the production of complex salts of aluminum, penicillin and a p-aminobenzenesulfonamide and the products produced thereby.

Penicillin and the sulfonamides are well-known antibacterial agents. They are often administered in combination with each other since their action is complementary and synergistic. The combination also has additional advantages in reducing drugfastness, reducing toxicity, and having a wider spectrum of action. In view of these advantages the elimination of any difficulties resulting from the therapeutic use of the combination becomes exceedingly important. Some of those difficulties are poor penicillin stability, bad taste and objectionable odor.

It is therefore an object of the present invention to provide novel preparations of penicillin and a p-aminobenzenesulfonamide which are superior to previously known combinations of penicillin and a p-aminobenzenesulfonamide. Another object is to provide novel preparations of penicillin and a p-aminobenzenesulfonamide which are particularly well adapted for oral administration because of reduced taste and odor. Another object is to provide novel preparations of penicillin and a p-aminobenzenesulfonamide possessing enhanced stability. Still another object is to provide novel preparations of penicillin and a p-aminobenzenesulfonamide possessing therapeutic effectiveness, producing high and prolonged blood levels. Other objects will be apparent to those skilled in the art to which this invention pertains.

The foregoing and additional objects are accomplished in the present invention by mixing aqueous solutions of a soluble salt of each of penicillin, p-aminobenzenesulfonamide, and aluminum and separating the precipitate which forms. There is thus-obtained a complex salt of aluminum, penicillin, and a p-aminobenzenesulfonamide having markedly increased stability, improved taste and odor and high therapeutic effectiveness.

The novel complexes thus-obtained can be represented in general by the following formula:

$$Al(Pen)_n(Sulf)_{3-n}$$

wherein Al represents a trivalent aluminum atom, Pen represents a monovalent radical of penicillin, Sulf represents a monovalent radical of a p-aminobenzenesulfonamide, and $n$ represents a number from one to two.

The increased stability of the novel compounds of the present invention is aptly represented in Table I following in this specification.

TABLE I

| Combination tested: | Percent [1] |
|---|---|
| Mixture of sulfamethazine and potassium penicillin G | 4.79 |
| Mixture of sulfacetamide and potassium penicillin G | 6.27 |
| Mixture of sulfadiazine and potassium penicillin G | 7.39 |
| Mixture of sulfacetamide and aluminum tripenicillin G | 38.05 |
| Aluminum tripenicillin G | 38.74 |
| Mixture of sulfamethazine and aluminum tripenicillin G | 44.74 |
| Aluminum monopenicillin G disulfacetamide | 62.89 |
| Aluminum dipenicillin G monosulfamethazine | 72.46 |
| Aluminum dipenicillin G monosulfacetamide | 74.81 |

[1] Penicillin remaining after ageing two weeks at 25 degrees centigrade in aqueous medium.

From the foregoing it is readily apparent that penicillin is considerably more stable in the form of the novel compounds of the present invention than in any other form tested. It was about 73 percent more stable on the average in the form of the novel compounds of the present invention than in situations in which penicillin was tested in the form of the aluminum tripenicillin salt and about 1039 percent more stable than in situations in which penicillin was tested in the form of its alkali metal salt. This result was completely unexpected prior to the present invention. By using proper stoichiometric proportions of reactants in the novel process of the present invention, two main series of novel compounds can be prepared: monopenicillin aluminum di-p-aminobenzenesulfonamide ($n=1$) and dipenicillin aluminum mono-p-aminobenzenesulfonamide ($n=2$). However, penicillin can be associated in any therapeutically desirable combination with the p-aminobenzenesulfonamides. Thus, by varying the proportions of penicillin and p-aminobenzenesulfonamide while the aluminum remains constant, it is possible to produce complex salts of aluminum, penicillin and p-aminobenzenesulfonamide, the composition of which is intermediate to those of the two main series just mentioned. For example, it is possible also to prepare products with the following proportions:

(a) Two aluminum atoms to three penicillin radicals to three p-aminobenzenesulfonamide atoms
(b) Four aluminum radicals to five penicillin radicals to seven p-aminobenzenesulfonamide radicals
(c) Four aluminum atoms to seven penicillin radicals to five p-aminobenzenesulfonamide radicals.

Obviously, many similar examples can be given.

Similarly, a mixture of two or more different penicillins and/or a mixture of two or more different p-aminobenzenesulfonamides can be used in the same reaction with the water soluble aluminum salt.

In general the novel compounds and complexes of the present invention are most suitably prepared by mixing together aqueous solutions containing the desired equivalents of a soluble salt of penicillin and a soluble salt of the p-aminobenzenesulfonamide. To this combined solution is added, with continuous stirring, an equeous solution containing the desired equivalent of a soluble salt of aluminum, at which point the product is precipitated as an insoluble solid. The latter is collected immediately by filtration, washed with water and dried. The reaction is operative at any temperature between about zero degree centigrade to about 100 degrees centigrade, although a temperature between about freezing and room temperature is preferred. Although water is the preferred solvent for this reaction, other aqueous solvents can be used. Among the water soluble salts of penicillin which can be utilized in the process of this invention are the sodium, potassium, calcium, barium, diethanolamine, 2 - methyl - 2 - aminopropanol, methylamine, isopropylamine, and ethanolamine salts of penicillin. The alkali metal salts are preferred because of their availability. Among the soluble salts of the selected p-aminobenzenesulfonamide which can be utilized in the process of this invention are the sodium, potassium, calcium, diethanolamine, 2 - methyl - 2 - aminopropanol, methylamine, isopropylamine, and ethanolamine salts. The alkali metal salts are preferred because of their availability.

As aqueous penicillin solutions are rapidly inactivated above pH 8, it is desirable to take steps to prevent such inactivation in order to assure a product of high penicillin potency. For example, it was found, in the preparation of monopenicillin O aluminum disulfamethazine, that the p-aminobenzenesulfonamide solution is at about pH 10.9, and the addition of the penicillin at about pH 6.5 results in a mixture of about pH 10.0. The immediate addition of an excess of aluminum sulfate lowers the pH to a more favorable point for the stability of the penicillin. Furthermore, an excess of aluminum sulfate helps to drive the reaction to completion. It was found that chilling the solutions of the reactants to just above freezing before mixing gives a product of high penicillin potency. It is desirable, therefore, to mix the solutions at a temperature below about 25 degrees centigrade advantageously below about ten or fifteen degrees centigrade.

The term "penicillin" is used herein in its generic sense and denotes the several types produced by the customary mold-growth processes of penicillin production such as penicillin G (benzyl penicillin), penicillin O, penicillin F, penicillin dihydro F, penicillin K, penicillin X and the like together with mixtures of the foregoing penicillins, and the like.

The term "p-aminobenzenesulfonamide" includes sulfanilamide and the various sulfanilamide derivatives involving replacement of a hydrogen atom on the amino and/or amido groups by another group; for example, sulfamethazine, sulfacetamide, sulfamerazine, sulfadiazine, sulfapyridine, sulfathiazole, phthalylsulfathiazole, succinylsulfathiazole, and the like.

The following examples are illustrative of the process and products of the present invention but are not to be construed as limiting.

*Example 1a.—Monopenicillin G aluminum disulfadiazine*

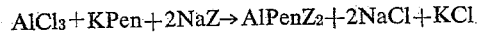

where Pen represents penicillin G and Z stands for sulfadiazine.

5.44 grams (0.02 mole) of sodium sulfadiazine was dissolved in fifteen milliliters of distilled water; 3.72 grams (0.01 mole) of potassium penicillin G was dissolved in ten milliliters of distilled water; and 1.33 grams (0.01 mole) of aluminum chloride was dissolved in ten milliliters of distilled water. All three solutions were cooled to about ten degrees centigrade. The sulfadiazine and penicillin solutions were then mixed thoroughly. This was followed immediately by the solution of aluminum chloride which was added quickly and with constant stirring. A heavy white precipitate of monopenicillin G aluminum disulfadiazine formed. The precipitate was then collected on a fritted glass filter, washed with twenty milliliters of distilled water and finally dried in a vacuum desiccator over magnesium perchlorate. This preparation assayed 552 penicillin units per milligram, which is eighty percent of the theoretical assay.

*Example 1b.—Monopenicillin G aluminum disulfacetamide*

In the manner shown in Example 1a, monopenicillin G aluminum disulfacetamide is prepared by substituting sodium sulfacetamide for the sodium sulfadiazine in the reaction.

*Example 2a.—Dipenicillin G aluminum monosulfadiazine*

68.06 grams of sodium sulfadiazine was dissolved in 300 milliliters of deionized water; 186.5 grams of potassium penicillin G was dissolved in 350 milliliters of deionized water; and 83.3 grams of $Al_2(SO_4)_3 \cdot 18H_2O$ in 300 milliliters of deionized water. The sulfadiazine and penicillin solutions were then mixed. Immediately and with constant stirring, the aluminum sulfate solution was added gradually. Dipenicillin G aluminum monosulfadiazine precipitated out. The precipitate was collected on a filter, washed with two 300-milliliter portions of water, dried as much as possible by reduced pressure and finally dried more thoroughly under high vacuum at 32 degrees centigrade. This preparation assayed 1050 penicillin units per milligram.

*Example 2b.—Dipenicillin G aluminum monosulfamethazine*

In the manner shown in Example 2a dipenicillin G aluminum monosulfamethazine is prepared by substituting sodium sulfamethazine for the sodium sulfadiazine in the reaction.

*Example 2c.—Dipenicillin G aluminum monosulfacetamide*

In the manner shown in Example 2a dipenicillin G aluminum monosulfacetamide is prepared by substituting potassium sulfacetamide for the sodium sulfadiazine in the reaction.

*Example 3.—Monopenicillin O aluminum disulfamethazine*

1.60 grams (0.04 mole) of sodium hydroxide was dissolved in fifteen milliliters of water, and in that solution 11.13 grams (0.04 mole) of sulfamethazine was also dissolved. 10.00 grams (0.015 mole) of $Al_2(SO_4)_3 \cdot 18H_2O$ (ten percent in excess of the theoretical amount required for the reaction) were dissolved in ten milliliters of water. 7.37 grams (0.2 mole) of potassium penicillin O was dissolved in fifteen milliliters of water. All three solutions were chilled in a refrigerator for twenty minutes. The sulfamethazine and penicillin solutions were then mixed thoroughly and to this mixture immediately was added the aluminum sulfate solution, stirring continuously. The thick, flocculent precipitate of monopenicillin O aluminum disulfamethazine was collected on a fritted glass filter and washed three times with successive small portions of water. The precipitate on the filter was dried as much as possible by reduced pressure and finally dried thoroughly at 45 degrees centigrade in a hot air oven with circulating air.

*Example 4.—Dipenicillin O aluminum monosulfacetamide*

0.40 gram (0.01 mole) of sodium hydroxide was dissolved in five milliliters of water, and 2.14 (0.01 mole) of sulfacetamide was dissolved in the resulting solution. 3.67 grams (0.0075 mole) of $Al_2(SO_4)_3 \cdot 18H_2O$ (ten percent in excess of the theoretical amount required for the reaction) in five milliliters of water and 7.37 grams (0.02 mole) of potassium penicillin O in fifteen milliliters of water. All three solutions were chilled in a refrigerator for twenty minutes. The sodium sulfacetamide solution was added to the penicillin solution and the mixture was stirred. To this mixture the aluminum sulfate solution was immediately added with constant stirring. The white copious precipitate of dipenicillin O aluminum monosulfacetamide was collected on a fritted glass filter and washed three times with cold water. The precipitate on the filter was dried as much as possible by reduced pressure, removed from the filter and finally dried more thoroughly in a hot air oven at fifty degrees centigrade.

*Example 5.—Monopenicillin G aluminum monosulfamethazine monosulfacetamide*

1.60 grams of sodium hydroxide was dissolved in fifteen milliliters of deionized water, and 5.57 grams of sulfamethazine and 4.28 grams of sulfacetamide were dissolved in the resulting solution. 7.33 grams of $Al_2(SO_4)_3.18H_2O$ (ten percent in excess of the theoretical amount required for the reaction) in ten milliliters of deionized water and 7.45 grams of potassium penicillin G in fifteen milliliters of deionized water. All three solutions were cooled to about five degrees centigrade. The sulfonamide solution and the penicillin solution were then mixed thoroughly. To this mixture was immediately added the aluminum sulfate solution, stirring well. The heavy white precipitate of monopenicillin G aluminum monosulfamethazine monosulfacetamide was collected on a filter and washed three times with successive small portions of cold deionized water. The precipitate on the filter was dried as much as possible by reduced pressure then removed and finally dried throughly at 45 degrees centigrade in a hot air oven with circulating air.

*Example 6.—Monopenicillin G monopenicillin O aluminum monosulfadiazine*

0.80 gram of sodium hydroxide was dissolved in ten milliliters of water, and 5.44 grams of sulfadiazine was dissolved in the resulting solution. 7.33 grams of $Al_2(SO_4)_3.18H_2O$ (ten percent in excess of the theoretical amount required for the reaction) was dissolved in ten milliliters of water. 7.45 grams of potassium penicillin G and 7.37 grams of potassium penicillin O were dissolved in thirty milliliters of water. All three solutions were cooled. The sulfadiazine and penicillin solutions were then mixed thoroughly. To this mixture was immediately added the aluminum sulfate solution, stirring well. The white, heavy precipitate of monopenicillin G monopenicillin O aluminum monosulfadiazine was collected on a filter and washed three times with successive small portions of cold water. The precipitate on the filter was dried as much as possible by reduced pressure then removed and finally dried thoroughly at 45 degrees centigrade in a hot air oven with circulating air.

In a manner similar to that illustrated in the above examples, other ternary aluminum salts of penicillin and a p-aminobenzenesulfonamide can also be prepared having the generic formula

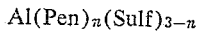

$$Al(Pen)_n(Sulf)_{3-n}$$

wherein Pen represents penicillin O, penicillin G, penicillin F, penicillin dihydro F, penicillin K, penicillin X, and like penicillins; Sulf represents sulfadiazine, sulfacetamide, sulfamerazine, sulfamethazine, sulfanilamide, sulfapyridine, sulfathiazole, phthalylsulfathiazole, succinylsulfathiazole, and like p-aminobenzenesulfonamides; and *n* represents a positive integer of less than three. Among the foregoing which are therapeutically desirable at the present time are the following: dipenicillin O aluminum monosulfamethazine, monopenicillin O monopenicillin G aluminum monosulfamethazine, monopenicillin O aluminum disulfamethazine, monopenicillin O aluminum monosulfamethazine monosulfacetamide, monopenicillin O aluminum monosulfamethazine monosulfamerazine, monopenicillin O aluminum monosulfamethazine monosulfadiazine, monopenicillin O aluminum monosulfamethazine monosulfapyridine, monopenicillin O aluminum monosulfamethazine monosulfathiazole, dipenicillin O aluminum monosulfacetamide, monopenicillin O monopenicillin G aluminum monosulfacetamide, monopenicillin O aluminum monosulfacetamide monosulfamethazine, monopenicillin O aluminum disulfacetamide, monopenicillin O aluminum monosulfacetamide monosulfamerazine, monopenicillin O aluminum monosulfacetamide monosulfadiazine, monopenicillin O aluminum monosulfacetamide monosulfapyridine, monopenicillin O aluminum monosulfacetamide monosulfathiazole, dipenicillin O aluminum monosulfamerazene, monopenicillin O monopenicillin G aluminum monosulfamerazine, monopenicillin O aluminum monosulfamerazine monosulfamethazine, monopenicillin O aluminum monosulfamerazine monosulfacetamide, monopenicillin O aluminum disulfamerazine, monopenicillin O aluminum monosulfamerazine monosulfadiazine, monopenicillin O aluminum monosulfamerazine monosulfapyridine, monopenicillin O aluminum monosulfamerazine monosulfathiazole, dipenicillin O aluminum monosulfadiazine, monopenicillin O monopenicillin G aluminum monosulfadiazine, monopenicillin O aluminum monosulfadiazine monosulfamethazine, monopenicillin O aluminum monosulfadiazine monosulfacetamide, monopenicillin O aluminum monosulfadiazine monosulfamerazine, monopenicillin O aluminum disulfadiazine, monopenicillin O aluminum monosulfadiazine monosulfapyridine, monopenicillin O aluminum monosulfadiazine monosulfathiazole, dipenicillin O aluminum monosulfapyridine, monopenicillin O monopenicillin G aluminum monosulfapyridine, monopenicillin O aluminum monosulfapyridine monosulfamethazine, monopenicillin O aluminum monosulfapyridine monosulfacetamide, monopenicillin O aluminum monosulfapyridine monosulfamerazine, monopenicillin O aluminum monosulfapyridine monosulfadiazine, monopenicillin O aluminum disulfapyridine, monopenicillin O aluminum monosulfapyridine monosulfathiazole, dipenicillin O aluminum monosulfathiazole, monopenicillin O monopenicillin G aluminum monosulfathiazole, monopenicillin O aluminum monosulfathiazole monosulfamethazine, monopenicillin O aluminum monosulfathiazole monosulfacetamide, monopenicillin O aluminum monosulfathiazole monosulfamerazine, monopenicillin O aluminum monosulfathiazole monosulfadiazine, monopenicillin O aluminum monosulfathiazole monosulfapyridine, monopenicillin O aluminum disulfathiazole, monopenicillin G monopenicillin O aluminum monosulfamethazine, dipenicillin G aluminum monosulfamethazine, monopenicillin G aluminum disulfamethazine, monopenicillin G aluminum monosulfamethazine monosulfacetamide, monopenicillin G aluminum monosulfamethazine monosulfamerazine, monopenicillin G aluminum monosulfamethazine monosulfadiazine, monopenicillin G aluminum monosulfamethazine monosulfapyridine, monopenicillin G aluminum monosulfamethazine monosulfathiazole, monopenicillin G monopenicillin O aluminum monosulfacetamide, dipenicillin G aluminum monosulfacetamide, monopenicillin G aluminum monosulfacetamide monosulfamethazine, monopenicillin G aluminum disulfacetamide, monopenicillin G aluminum monosulfacetamide monosulfamerazine, monopenicillin G aluminum monosulfacetamide monosulfadiazine, monopenicillin G aluminum monosulfacetamide monosulfapyridine, monopenicillin G aluminum monosulfacetamide monosulfathiazole, monopenicillin G monopenicillin O aluminum monosulfamerazine, dipenicillin G aluminum monosulfamerazine, monopenicillin G aluminum monosulfamerazine monosulfamethazine, monopenicillin G aluminum monosulfamerazine monosulfacetamide, monopenicillin G aluminum disulfamerazine, monopenicillin G aluminum monosulfamerazine monosulfadiazine, monopenicillin G aluminum monosulfamerazine monosulfapyridine, monopenicillin G aluminum monosulfamerazine monosulfathiazole, monopenicillin G monopenicillin O aluminum monosulfadiazine, dipenicillin G aluminum monosulfadiazine, monopenicillin G aluminum monosulfadiazine monosulfamethazine, monopenicillin G aluminum monosulfadiazine monosulfacetamide, monopenicillin G aluminum monosulfadiazine monosulfamerazine, monopenicillin G aluminum disulfadiazine, monopenicillin G aluminum monosulfadiazine monosulfapyridine, monopenicillin G aluminum monosulfadiazine monosulfathiazole, monopenicillin G monopenicillin O aluminum monosulfapyridine, dipenicillin G aluminum monosulfapyridine, monopenicillin G aluminum monosulfapyridine monosulfamethazine, monopenicillin G aluminum monosulfapyridine monosulfacetamide, monopenicillin G aluminum monosulfapyridine monosulfamerazine, monopenicillin G aluminum monosulfapyridine monosulfadiazine, monopenicillin G aluminum disulfapyridine, monopenicillin G aluminum monosulfapyridine monosulfathiazole, monopenicillin G monopenicillin O aluminum monosulfathiazole, dipenicillin G aluminum monosulfathiazole, monopenicillin G aluminum monosulfathiazole monosulfamethazine, monopenicillin G aluminum monosulfathiazole monosulfacetamide, monopenicillin G aluminum monosulfathiazole monosulfamerazine, monopenicillin G aluminum monosulfathiazole monosulfadiazine, monopenicillin G aluminum monosulfathiazole monosulfapyridine, monopenicillin G aluminum sulfathiazole.

Also, by varying the ratio of penicillin to p-aminobenzenesulfonamide, complex salts of the general formula indicated above in which $n$ is greater than one and less than two, are obtained. Similarly, still more complex salts are obtained by including two or more different penicillins and/or two or more different p-aminobenzenesulfonamides.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. Monopenicillin G aluminum disulfadiazine.
2. Dipenicillin G aluminum monosulfadiazine.
3. Monopenicillin O aluminum disulfamethazine.
4. Dipenicillin G aluminum monosulfacetamide.
5. Monopenicillin G aluminum monosulfamethazine monosulfacetamide.
6. A process for producing monopenicillin G aluminum disulfadiazine which comprises mixing together aqueous solutions cooled to between about zero and about room temperature of a soluble alkali metal salt of penicillin G, a soluble alkali metal salt of sulfadiazine, and aluminum chloride in the molar relation of one to two to one, and separating the resulting monopenicillin G aluminum disulfadiazine.
7. A process for producing dipenicillin G aluminum monosulfadiazine which comprises mixing together aqueous solutions of a soluble alkali metal salt of penicillin G, a soluble alkali metal salt of sulfadiazine, and aluminum sulfate in the molar relation of two to one to one and separating the resulting dipenicillin G aluminum monosulfadiazine.
8. A process for producing monopenicillin O aluminum disulfamethazine which comprises mixing together chilled aqueous solutions of a soluble alkali metal salt of penicillin O, a soluble alkali metal salt of sulfamethazine, and aluminum sulfate in the molar relation of one to two to 1.1 and separating the resulting monopenicillin O aluminum disulfamethazine.
9. A process for producing dipenicillin G aluminum monosulfacetamide which comprises mixing together chilled aqueous solutions of a soluble alkali metal salt of penicillin G, a soluble alkali metal salt of sulfacetamide, and aluminum sulfate in the molar relation of two to one to 1.1 and separating the resulting dipenicillin G aluminum monosulfacetamide.
10. A process for producing monopenicillin G aluminum monosulfamethazine monosulfacetamide which comprises mixing together aqueous solutions, chilled to between about zero degree centigrade and about room temperature, of a soluble alkali metal salt of penicillin G, a soluble alkali metal salt of sulfamethazine, a soluble akali metal salt of sulfacetamide, and aluminum sulfate in the molar relation of one to one to one to 1.1 and separating the resulting monopenicillin G aluminum monosulfamethazine monosulfacetamide.
11. A compound of the formula

$$Al(Pen)_n(Sulf)_{3-n}$$

wherein Al represents a trivalent aluminum atom, Pen represents a monovalent radical of penicillin, Sulf represents a monovalent p-aminobenzenesulfonamide radical selected from the group consisting of sulfamethazine, sulfacetamide, sulfamerazine, sulfadiazine, sulfapyridine, sulfathiazole, phthalylsulfathiazole, succinylsulfathiazole and mixtures thereof, and $n$ represents a positive integer of less than three.

12. The process which comprises mixing aqueous solutions of three reactants in a molecular ratio of from about 1:2:1 to about 2:1:1, the first reactant being an alkali metal salt of penicillin, the second reactant being an alkali metal salt of a p-aminobenzenesulfonamide selected from the group consisting of sulfamethazine, sulfacetamide, sulfamerazine, sulfadiazine, sulfapyridine, sulfathiazole, phthalylsulfathiazole, succinylsulfathiazole and mixtures thereof, and the third reactant being a member selected from the group consisting of aluminum sulfate and aluminum chloride and separating the resulting precipitate.

References Cited in the file of this patent
UNITED STATES PATENTS

| 2,530,372 | Bohls | Nov. 21, 1950 |
| 2,562,152 | Shortridge | July 24, 1951 |
| 2,564,565 | Conn | Aug. 14, 1951 |

FOREIGN PATENTS

| 661,357 | Great Britain | Nov. 21, 1951 |

OTHER REFERENCES

Krantz et al.: "Science," vol. 101, June 5, 1945, pp. 618–19.